United States Patent [19]
Hofmeister et al.

[11] 3,763,675
[45] Oct. 9, 1973

[54] TRAILER LOCK APPARATUS

[76] Inventors: Robert W. Hofmeister, 2345 W. Old Shakopee Rd., Bloomington, Minn. 55420; Thorwald J. Mickelson, Apt. No. 7-215, 3305 Harbor Ln. North, Minneapolis, Minn. 55441

[22] Filed: Feb. 24, 1972

[21] Appl. No.: 228,907

[52] U.S. Cl. .................................... 70/232, 70/34
[51] Int. Cl. ..................... B60r 25/00, F16b 41/00
[58] Field of Search ................... 70/34, 57, 58, 229, 70/231, 232, 258, 360, 361, DIG. 58

[56] References Cited
UNITED STATES PATENTS

| | | | |
|---|---|---|---|
| 2,630,699 | 3/1953 | Langdon | 70/232 |
| 2,755,655 | 7/1956 | Maffey | 70/232 |
| 2,706,392 | 4/1955 | Lucas et al. | 70/232 |
| 2,910,860 | 11/1959 | Moreno Camba | 70/338 |

*Primary Examiner*—Albert G. Craig, Jr.
*Attorney*—Ralph L. Dugger et al.

[57] ABSTRACT

A tractor having a fifth wheel assembly for towing a semitrailer having a king pin and a lock apparatus to block a conventional interlocking towing connection between the tractor and trailer, the lock apparatus including a housing having a main body and cover to provide a king pin chamber and a second chamber opening to the king pin chamber, a lock bar reciprocally mounted in the housing second chamber and having a recessed end portion locatable adjacent the reduced diameter portion of the king pin to block removal of the housing from the king pin and a retainer bar receiving slot, a retainer bar mounted by the housing that is resiliently urged downwardly to in part extend through the slot to retain the lock bar in a locking position and a key operated lock mounted by the lock bar and having a key operated cam member for moving the retainer bar upwardly to permit the lock bar being moved to an unlocked position.

13 Claims, 5 Drawing Figures

PATENTED OCT 9 1973 3,763,675

TRAILER LOCK APPARATUS

BACKGROUND OF THE INVENTION

Lock apparatus mountable on a trailer king pin.

During the present times semitrailers are frequently parked in places that are relatively deserted at night, or at busy terminals where no one is relatively constantly paying close attention to tractors picking up semitrailers. As a result, relatively frequently a dishonest party will back a tractor up to a loaded trailer and make off with the trailer without the trailer being missed for several hours. In order to provide a lock mechanism that will severely hamper the stealing of a trailer and still be of a convenient weight and size, this invention has been made.

SUMMARY OF THE INVENTION

Lock apparatus for lockingly engaging a semitrailer king pin that includes a housing having a king pin receiving chamber and a second chamber opening to the king pin chamber, a lock bar slidably mounted by the housing for movement between a locked position extending into the king pin chamber and an unlocked position, a retainer bar mounted by the housing for movement between a first position cooperating with the lock bar to retain it in a locked position and a second position permitting moving the lock bar to an unlocked position and a key operated lock mounted for operating the retainer bar from its first position to its second position.

One of the objects of this invention is to provide new and novel lock apparatus for a semitrailer king pin that is of a construction that it cannot be operated to an unlocked position on a king pin with a pen knife, credit card or similar object. In furtherance of the above object, it is a further object of this invention to provide new and novel lock apparatus that can be readily dismantled for cleaning and repair, but once locked on a king pin, is extremely difficult to remove from the king pin without the proper key.

BRIEF DESCRIPTION OF THE DRAWINGS

Referring to FIG. 1 there is illustrated a tractor 10 having a fifth wheel assembly generally designated 11 for being connected to the trailer 12 for towing the trailer, the trailer having a conventional king pin 13 dependingly attached to the king pin mounting member 9 of the trailer which has a generally flat lower surface of a substantially larger area than the maximum cross-sectional area of the king pin. As conventional, the fifth wheel assembly includes a fifth wheel plate 11a having a guide slot 14 opening to the outer edge thereof and that converges in a direction toward the partial circular recess 15, and lock mechanism 11b for releasably locking the king pin in the partial circular recess 15. As may in part be noted from FIG. 4, the king pin has an upper cylindrical portion 13a that is joined to the front end of the trailer, a reduced diameter cylindrical portion 13b, and a lower cylindrical portion 13c that is joined to the lower end of portion 13b and is of a diameter substantially the same as the diameter of upper portion 13a.

Referring now to FIGS. 3–5, the lock apparatus includes a metal housing having a main body, generally designated 18. The main body 18 includes side walls 19, 20, a semicircular front wall 22 and a bottom wall 23 that are integrally joined together and cooperate with the cover, generally designated 30, to provide a generally cylindrical king pin receiving chamber 25 that opens downwardly and upwardly through the housing, and a second chamber 26 that opens to the king pin chamber and through the back surface of the housing. The side walls and cover extend further rearwardly than the bottom wall. Also, side walls extend to the same elevation as the front wall; while each side wall is provided with a generally rectangular cutout 28 that opens upwardly and toward the other side wall and extends from the front wall to the opposite end surfaces of the side walls.

Figure 1:
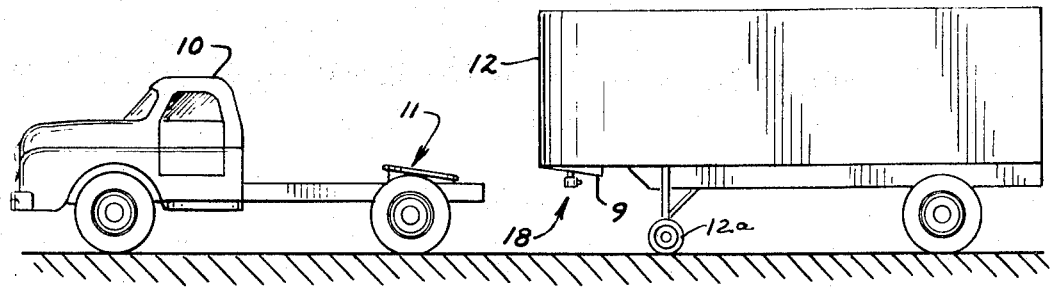
FIG. 1 is a side view of a tractor and a semi-trailer in a parked position separated from the tractor.
Figure 3:
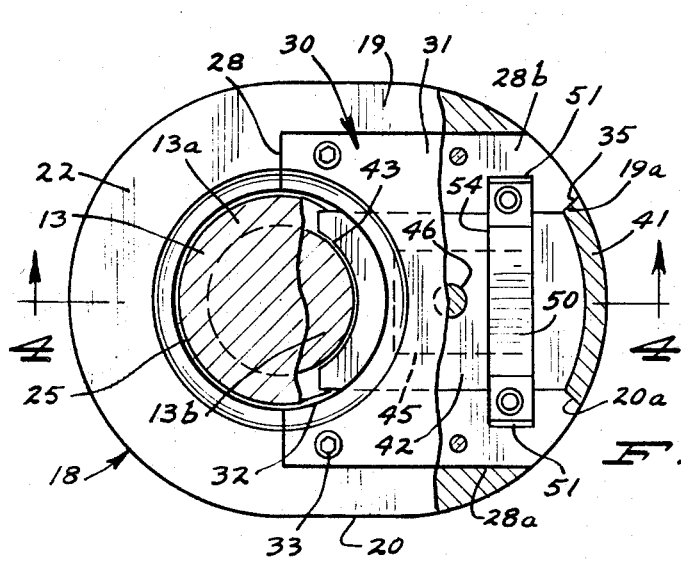
FIG. 3 is a horizontal view, part in cross section, generally taken along the line and in the direction of the arrows 3—3 in FIG. 5 with the lock apparatus of this invention in a locked position on a king pin, part of the king pin being shown at a different elevation than the remainder of the king pin.
Figure 2:
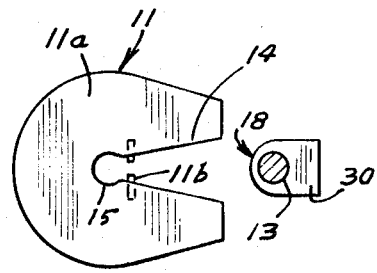
FIG. 2 is a horizontal schematic illustration of a part of the fifth wheel mechanism of the tractor and the king pin of the trailer with the lock apparatus of this invention thereon.
Figure 4:
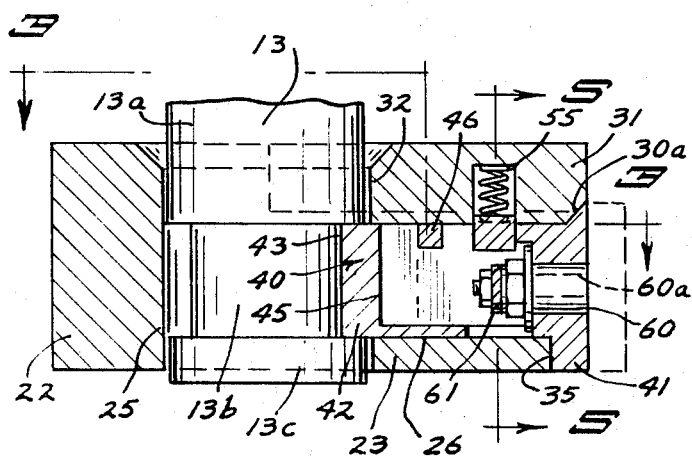
FIG. 4 is a longitudinal cross-sectional view generally taken along the line and in the direction of arrows 4—4 of the apparatus of FIG. 3.
Figure 5:
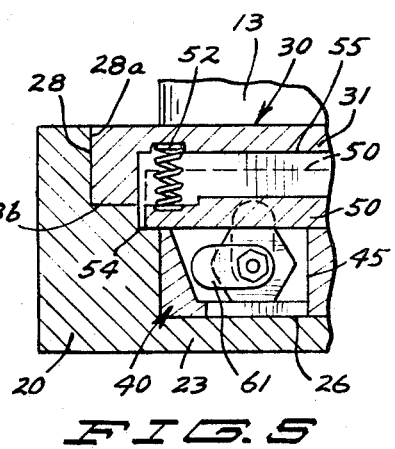
FIG. 5 is a transverse cross-sectional view generally taken along the line and in the direction of arrows 5—5 of FIG. 4.

The cover 30 includes a plate 31 that extends the length of the notches 28 to form a close fit with the vertical walls 28a of the notches and in part rearwardly thereof. The cover when seated in the notches 28 extends to the same height as the front and side walls and has a semicircular recess 32 at the front end thereof that is of the same radius as the other parts of the king pin chamber 25 and a portion extending between the side walls that extends to a somewhat lower elevation than the horizontal walls 28b of the notches 28. The cover is secured to the main body 18 by recessed bolts 33 that do not extend above the top surface of the cover, the recesses for the bolts opening upwardly through the cover.

At the end of the cover opposite the king pin, the cover has a transverse, arcuate surface portion 30a that is tapered upwardly and rearwardly while the side walls have adjacent vertical surfaces portions 18a, 20a that between the plane of the bottom surface of the bottom wall and the horizontal surfaces 28b of the notches 28 diverge from one another, the width of surfaces 19a, 20a, 30a being substantially the same. Surfaces 19a, 20a, 30a provide a cutout 35 that opens to the rear of chamber 26 and outwardly through the rear of the housing and downwardly whereby the vertical and horizontal dimensions of the cutout at the rear of the chamber 26 are smaller than at a location further rearwardly.

A lock bar, generally designated 40, includes a rear end portion 41 of dimensions to fill the cutout 35 and a main body portion 42 joined to portion 41 that is of a size and shape to fill the rear portion of chamber that is adjacent cutout 35 and fill the front portion of chamber 26 when the lock bar is in a king pin locking position. Portion 41 extends downwardly to the plane of the bottom surface of the bottom wall and has tapered surface portions that form a close fit with surfaces 19a, 20a, 30a; the adjacent edges of surface portions 19a, 30a and 20a, 30a respectively meeting at common edges that diverge rearwardly in upwardly, transverse and rearwardly directions.

Thus in a direction away from the king pin chamber, the rearward part of portion 41 has tapered side portions that diverge to form a close fit with surface portions 19a, 20a from the top to the bottom thereof when the lock bar is in a locking position while the upper rear surface part of portion 41 is arcuately curved and tapered to form a close fit with surface 30a. Thus, the maximum transverse and vertical dimensions of portion 41 of the rear part thereof are substantially greater than the corresponding dimensions of the front part of portion 41 and the corresponding dimensions of portion 42, portion 41 extending further upwardly, downwardly and outwardly on either side of bar 40 than portion 42 and forming a close fit with the rear vertical edge of bottom wall 23.

A vertically elongated arcuate recessed 43 is formed in the front end portion of the lock bar main body portion to extend the height thereof, the radius of curvature of recess 43 being slightly larger than the radius of king pin portion 13b, but substantially smaller than the radius of curvature of each of recess 32 and chamber 25. Recess 43 extends arcuately through an angle substantially less than 180° but greater than 90°.

A generally rectangular notch 45 is formed in the lock bar between the front and rear portions thereof to open only upwardly, while a stop 46 is dependingly secured to the central portion of the cover plate 31 to extend into the notch 45 for limiting the withdrawal movement of the lock bar to prevent it from being completely withdrawn from the housing when the cover is bolted in place.

In order to releasably retain the lock bar in a locked condition, there is provided a retainer bar 50 that is of a transverse dimension greater than the transverse dimension of the main body 42, and of a smaller transverse dimension than the spacing of walls 28a. Just forwardly of the lock bar rear end portion 41 in a king pin locked position, each of the housing side walls is provided with a generally rectangular notch 51 that is of a size to receive the adjacent end portion of bar 50 while each side wall portion of the lock bar that in part defines notch 45 has an upwardly opening notch 54 that opens to the adjacent notch 51 and to notch 45 whereby when the retainer bar is in its lowermost position in notches 45, 51, 54, the top surface thereof is below the top surface of the side wall portions of the lock bar and the bottom surface of the cover to prevent withdrawal movement of the lock bar relative the housing. The cover has a downwardly opening slot 55 that is of a greater height and a greater transverse width than the corresponding dimensions of the retainer bar, slot 55 opening to notches 51 and to notches 54 when the lock bar is in a king pin locking position to have the retainer bar moved thereinto to permit withdrawal movement of the lock bar. Coil springs 52 have one ends seated in downwardly opening apertures formed in the cover plate to extend only partially therethrough and open to notch 55 and opposite ends seated in upwardly opening apertures in the end portions of the retainer bar to resiliently urge the retainer bar downwardly out of the notch 55, and to retain the retainer bar in a generally horizontal condition as it is moved between its locked and unlocked positions. Through the provision of the notches 51 and 55, the retainer bar is prevented from moving any substantial distance forwardly or rearwardly but is vertically movable a limited amount. Further, the retainer bar is completely enclosed, and when it is in a locking position in the lock bar, due to the tapered surfaces 19a, 20a, 30a and the first end portion of the lock bar forming a close fit therewith and the lower part of portion 41 extending vertically a substantial distance below the top surface of the bottom wall and closely adjacent the rear edge of the bottom wall, when the lock apparatus is locked on the king pin, a plastic card or other item cannot be moved in a straight line direction to contact any part of the retainer bar. Additionally, the rear surfaces of the housing and lock bar is of a semicircular cylindrical shape from closely adjacent the top of the housing to adjacent the bottom surface thereof to make it more difficult to tamper with the lock apparatus.

In order to move the retainer bar from a position that it extends through slots 54, to an unlocked position that the bar is at higher elevation that the top surface of the main body of the lock bar, there is provided a key operated lock 60 that is mounted in the rear end portion of the lock bar to extend into notch 45. The lock has a cam arm 61 located within chamber 26 in underlying relationship to the retainer bar whereby inserting the key into the lock and turning the key, the cam arm 61 is rotated in a direction for elevating the retainer bar against the resilient action of springs 52; and upon the key being turned in the opposite direction, rotating the cam arm to permit the springs 52 resiliently urging the retainer bar to a locking position. The lock 60 is of a type that the cam arm is rotated between its position only when the proper key is inserted in the lock and cannot be withdrawn from the lock when the lock is in an unlocked condition. Thus the lock has a mounting member fixedly retained in end portion 41 and a rotary portion 60a that is rotatable only by the proper key and having the cam arm secured thereto to rotate therewith.

In using the apparatus of this invention with the trailer in a parked position with the retractable wheels 12a extended such as illustrated in FIG. 1 and the tractor moved away from a towing position relative the trailer, the key is turned in the lock 60 to rotate cam arm 61 for elevating the retainer bar such that the lower surface of the retainer bar is above the slots 54. Now the key while in the lock 60 (or a handle may be provided on the lock bar), the lock bar is retracted until the arcuate wall defining recess 43 is rearwardly of the arcuate wall defining recess 32. Then the lock apparatus is manually moved upwardly such that the kin pin extends into the chamber 25, and thereafter the lock bar pushed forwardly such that the surface of recess 43 is closely adjacent the wall of king pin reduced portion 13b. At this time the forward portion of the lock bar is located vertically between king pin portions 13a, 13c and the slots 54 are located vertically beneath the retainer bar whereby whereupon rotating the key in a locking direction, the lock arm 61 is pivoted so as to permit the springs resiliently forcing the retainer bar to a locked position relative to the lock bar. As a result, the lock apparatus is locked onto the king pin.

It is to be noted that when the lock apparatus is locked on the king pin, the king pin cannot be moved into the fifth wheel recess 15 since the transverse dimension of the lock housing is greater than the opening of the slot 14 to recess 15. Further, since in a locked position to top surfaces of the housing main body and cover plate are closely adjacent and underlying the bottom surface of the member 9 on which the king pin is mounted, bolts 33 cannot be removed. Additionally, since lock bar end portions 41 is of substantially greater transverse and vertical dimensions then the main body of the lock bar and the surfaces defining cutout 35 form a close fit with the adjacent parts of the lock bar, a card or wire or similar implement cannot be extended through opening 35 and into chamber 26 for moving the retainer bar to an unlocked position. The housing, retainer bar and lock bar are made of a metal that can withstand severe pounding without fracture or failure.

Even though walls 19, 20, and 22 have been referred to as a side wall, a side wall, and a front wall respectively, it is to be understood that these walls have been so designated for purposes of facilitating describing the invention and have no relationship to the actual angular position that the lock apparatus of the invention may be placed on the king pin.

Although not the preferred form of the invention because of increased size, by modifying the housing so that it extends a greater distance below the lock bar than that illustrated, the chamber 26 extended a substantial distance below the rear portion of the lock bar, the lock 60 may be mounted in the rear portion of the housing to open to the modified chamber 26 at a location substantially below the lock bar. In such a case notches 54 would be extended downwardly to a substantial elevation below the lock bar while side bars would be integrally joined to the end portions of retainer bar 50 to extend along side and below the lock bar together with a transverse bar integrally joined to the lower ends of the side bar below the lock bar to be operated by cam arm 60 for moving the retainer bar between its locked and unlocked positions, and permitting withdrawal movement of the lock bar when the retainer bar is up in slot 55.

What is claimed is:

1. Lock apparatus for lockingly engaging the king pin of a semitrailer to block movement of the king pin relative the fifth wheel assembly of a tractor to a road travel condition, wherein the king pin has upper and lower diametric portions and a reduced diametric portion vertically between said upper and lower portions, comprising a lock housing having an upwardly opening king pin chamber of a size to form a relatively close fit with upper and lower diametric portions of the king pin, and a second chamber opening to the king pin chamber between the top and bottom thereof, said housing including a main body portion having the chambers opening upwardly therethrough and a cover secured to said main body portion and extending over the second chamber, said cover including a cover plate closing the upward opening of said second chamber, a lock bar mounted by the housing for slidable movement between a position extending into the king pin chamber for extending vertically between said upper and lower portions when the king pin extends into the king pin chamber and an unlocked position located at least substantially out of the king pin chamber, said lock bar in the locked position extending through said second chamber, and having an upwardly opening slot, operable first means mounted by the housing for movement between a first position cooperating with the lock bar in its locked position for holding the lock bar in the locked position and a second position permitting the lock bar to be moved to its unlocked position, a key operated lock mounted by the lock bar, said lock having a cam member in the second chamber that is moved by turning a lock key in the lock for moving the first means from its first position to its second position, said first means comprising a retainer bar mounted for limited vertical movement by the housing between the first means first and second positions, said retainer bar having a portion located in said slot in the retainer bar first means first position for blocking sliding movement of the lock bar, said cover plate having a downwardly opening notch of a size to receive said retainer bar when the cam member moves the retainer bar upwardly.

2. Lock apparatus for lockingly engaging the king pin of a semitrailer to block movement of the king pin relative the fifth wheel assembly of a tractor to a road travel condition, wherein the king pin has upper and lower diametric portions and a reduced diametric portion vertically between said upper and lower portions, comprising a lock housing having an upwardly opening king pin chamber of a size to form a relatively close fit with upper and lower diametric portions of the king pin, and a second chamber opening to the king pin chamber between the top and bottom thereof, said housing including a main body portion having the chambers opening upwardly therethrough and a cover secured to said main body portion and extending over the second chamber, a lock bar mounted by the housing for slidable movement between a position extending into the king pin chamber for extending vertically between said upper and lower portions when the king pin extends into the king pin chamber and an unlocked position located at least substantially out of the king pin chamber, said lock bar in the locked position extending through said second chamber, and having an upwardly opening slot, operable first means mounted by the housing for movement between a first position cooperating with the lock bar in its locked position for holding the lock bar in the locked position and a second position permitting the lock bar to be moved to its unlocked position, a key operated lock mounted by one of the lock bar and the housing, said lock having a cam member in the second chamber that is moved by turning a lock key in the lock for moving the first means from its first position to its second position, said first means comprising a retainer bar mounted for limited vertical movement by the housing between the first means first and second positions, said retainer bar having a portion located in said slot in the retainer bar first means first position for blocking sliding movement of the lock bar, said housing having rear portions defining an opening through which the lock bar is slidably extended, the rear portions defining the last mentioned opening including parts defining a first opening portion opening to the second chamber and second parts defining a second opening portion that is of a substantially larger cross-sectional area than the first opening portions, said second opening portion opening to the first opening portion remote from the second chamber, said lock bar having a first end portion of a size and cross section to substantially fill the second opening portion when the lock bar is in its locked position.

3. The apparatus of claim 2 further characterized in that the lock bar has a second end portion opposite said lock bar first end portion, said lock bar second end portion having an arcuate recessed surface of a radius of curvature nearly the same as the radius of curvature of the king pin reduced diameter portion, and that the housing main body portion has an end wall, said housing end wall and cover plate cooperatively having wall surface portions that are of a radii of curvature only slightly larger than the king pin upper and lower portions and in part define said king pin chamber.

4. For blocking movement of a semitrailer king pin that has upper and lower diameter portions and a reduced diameter portion vertically between said upper and lower portions through the king pin guide slot of a tractor fifth wheel assembly and into the king pin receiving recess of the fifth wheel assembly, lock apparatus comprising a housing having a top wall, an interior chamber and a rear portion having a lock bar opening to the interior chamber, said top wall having a recessed opening that opens to said interior chamber and is of a radius slightly larger than the radius of each of said upper and lower portions, a lock bar having a first end portion and a second end portion defining an arcuate recess of a radius of curvature larger than the reduced portion and substantially smaller than the radius of the top wall opening, said lock bar being slidably extended through the rear portion opening and into the interior chamber for movement between a lock bar locked position extendable vertically between the upper and lower portions when the king pin is in said chamber and an unlocked position that the lock bar recess is closer to the rear portion than in the locked position, and having an elongated main body portion that has said second end portion and is joined to said first end portion, said rear portion defining the rear portion opening having first parts defining a first opening portion opening to the chamber that is of a size and shape to form a relatively close fit with the adjacent part of the first end portion in the first opening portion in the lock bar locked position and second parts defining a second opening portion that at least in part is of a substantially larger size than the first opening portion and opening thereto, said lock bar first end portion having a part of a size and shape to substantially fill the second opening portion, said interior chamber having a lower chamber recessed portion of a size and shape to receive the lower portion when the king pin is in the chamber and the lock bar is vertically between said upper and lower portions, operable first means in said chamber and movable between a first position cooperating with the lock bar in its locked position for blocking movement of the lock bar out of its locked position and a second position permitting the lock bar to be moved to its unlocked position, said first means comprising a retainer bar mounted for limited slidable movement by the housing, said lock bar having a retainer bar receiving slot, and said retainer bar extending in the slot to block movement of the lock bar in the first means first position and located out of the slot in the first means second position to permit moving the lock bar rearwardly, and key operated lock means extending into said chamber for operating the first means between its positions.

5. The apparatus of claim 4 further characterized in that the retainer bar is mounted for limited movement in the chamber between a locking position and an unlocked position and that the lock means has a key actuated cam member for moving the retainer bar between a locking position and an unlocked position.

6. The apparatus of claim 4 further characterized in that the top wall includes a cover plate having upwardly bolt receiving recesses, means in part located in said receiving recesses for securing the cover plate to the remainder of the housing, that said lock bar has an elongated notch beneath and opening toward the cover plate, and that there is provided a stop member dependingly joined to said cover plate to extend into the notch to limit the movement of the lock rear relative the housing.

7. The apparatus of claim 6 further characterized in that said housing has side walls, said side walls each having a generally rectangular notch opening to the interior chamber that is located on the opposite side of the lock bar from the other side wall, said side wall notches extending to lower elevations than the top of the lock bar and transversely to said slot when the lock bar is in a locking position, said retainer bar extending into said notches when the lock bar is in a locking position.

8. The apparatus of claim 7 further characterized in that said housing has a retainer bar receiving notch vertically above said side wall notches and opening thereto and to said slot when the lock bar is in a locking position to have the retainer bar therein when the retainer bar is in the first means second position.

9. For blocking movement of a semitrailer king pin that has upper and lower diameter portions and a reduced diameter portion vertically between said upper and lower portions through the king pin guide slot of a tractor fifth wheel assembly and into the king pin receiving recess of the fifth wheel assembly, lock apparatus comprising a housing having a top wall, an interior chamber and a rear portion having a lock bar opening to the interior chamber and opening exteriorly of the housing, said top wall having a recessed opening that opens to said interior chamber and is of a radius slightly larger than the radius of each of said upper and lower portions, a lock bar slidably extended through the rear portion opening and into the interior chamber for movement between a lock bar locked position extendable vertically between the upper and lower portions when the king pin is in said chamber and an unlocked position extending rearwardly of the locked position, said rear portion defining the rear portion opening having first parts defining a first opening portion opening exterior of the housing, said lock bar having an end portion of a size and shape that substantially fills the first opening portion when the lock bar is in its locked position, said interior chamber having a lower chamber recessed portion of a size and shape to receive the lower portion when the king pin is in the chamber and the lock bar is vertically between said upper and lower portions, operable first means in said chamber and movable between a first position cooperating with the lock bar in its locked position for blocking movement of the lock bar out of its locked position and a second position permitting the lock bar to be moved to its unlocked position, said first means comprising a retainer bar mounted for limited slidable movement by the housing, said lock bar having a retainer bar receiving slot, and said retainer bar extending in the slot to block movement of the lock bar in the first means first position and located out of the slot in the first means second position to permit moving the lock bar rearwardly, and key operated lock means extending into said chamber for operating the first means between its positions.

10. The apparatus of claim 9 further characterized in that the lock bar slot extends transverse to the direction of movement of the lock bar between its locked and unlocked positions and opens to the housing on opposite sides of the lock bar, and that the retainer bar is of a length to extend transversely through the slot and outwardly beyond each side of the lock bar.

11. The apparatus of claim 10 further characterized in that the housing has side walls that in part define the rear portion opening and have notches for slidably retaining the retainer bar for movement between a position in the lock bar slot and a position clear of the slot, and that the depth of the slot is less than the corresponding height of the retaining bar.

12. For blocking movement of a semitrailer king pin that has upper and lower diameter portions and a reduced diameter portion vertically between said upper and lower portions through the king pin guide slot of a tractor fifth wheel assembly and into the king pin receiving recess of the fifth wheel assembly, lock apparatus comprising a housing having a top wall, an interior chamber and a rear portion having a lock bar opening to the interior chamber, said top wall having a recessed opening that opens to said interior chamber and is of a radius slightly larger than the radius of each of said upper and lower portions, a lock bar slidably extended through the rear portion opening and into the interior chamber for movement between a lock bar locked position extendable vertically between the upper and lower portions when the king pin is in said chamber and an unlocked position extending rearwardly of the locked position, said interior chamber having a lower chamber recessed portion of a size and shape to receive the lower portion when the king pin is in the chamber and the lock bar is vertically between said upper and lower portions, operable first means in said chamber and movable between a first position cooperating with the lock bar in its locked position for blocking movement of the lock bar out of its locked position and a second position permitting the lock bar to be moved to its unlocked position, said first means comprising a retainer bar mounted for limited slidable movement by the housing, said lock bar having a retainer bar receiving slot, and said retainer bar extending in the slot to block movement of the lock bar in the first means first position and located out of the slot in the first means second position to permit moving the lock bar rearwardly, and key operated lock lmeans extending into said chamber for operating the first means including the retainer bar between its positions, said housing having side walls, said side walls each having a generally rectangular notch opening to the interior chamber that is located on the opposite side of the lock bar from the other side wall, said side wall notches extending to lower elevations than the top of the lock bar and transversely to said slot when the lock bar is in a locking position, said retainer bar extending into said notches when the lock bar is in a locking position.

13. The apparatus of claim 12 further characterized in that said housing top wall has a retainer bar receiving notch vertically above said side wall notches and opening thereto and to said slot when the lock bar is in a locking position to have the retainer bar therein when the retainer bar is in the first means second position.

* * * * *